United States Patent
McGhee

(10) Patent No.: US 9,604,155 B2
(45) Date of Patent: Mar. 28, 2017

(54) PLANT OIL EXTRACTION

(75) Inventor: David McGhee, Cleburne, TX (US)

(73) Assignee: David McGhee, Monument, CO (US)

( * ) Notice: Subject to any disclaimer, the term of this patent is extended or adjusted under 35 U.S.C. 154(b) by 870 days.

(21) Appl. No.: 12/802,424

(22) Filed: Jun. 7, 2010

(65) Prior Publication Data
US 2011/0133120 A1   Jun. 9, 2011

Related U.S. Application Data

(60) Provisional application No. 61/217,911, filed on Jun. 5, 2009.

(51) Int. Cl.
*B01D 11/02* (2006.01)
*C11B 1/10* (2006.01)
*C11B 9/02* (2006.01)

(52) U.S. Cl.
CPC ............ *B01D 11/0219* (2013.01); *C11B 1/10* (2013.01); *C11B 1/102* (2013.01); *C11B 1/104* (2013.01); *C11B 9/025* (2013.01)

(58) Field of Classification Search
USPC ....................................................... 422/261
See application file for complete search history.

(56) References Cited

U.S. PATENT DOCUMENTS

| | | | | |
|---|---|---|---|---|
| 3,936,489 A * | 2/1976 | Rozsa | ............... | B01D 11/0449 422/255 |
| 5,372,680 A * | 12/1994 | Bezdolny et al. | .............. | 202/83 |
| 5,525,746 A * | 6/1996 | Franke | ........................... | 554/12 |
| 6,860,998 B1* | 3/2005 | Wilde | .................... | C11B 9/025 210/136 |
| 9,327,210 B1* | 5/2016 | Jones | ................. | B01D 11/0219 |
| 2004/0147769 A1* | 7/2004 | Davis | ................ | 554/9 |
| 2008/0128261 A1* | 6/2008 | Balass | .......................... | 202/176 |

OTHER PUBLICATIONS

Energas. MSDS for Butane. Rev 5. Nov. 2005.*
"National Pipe Tread". Wikipedia. Capture from Apr. 12, 2009.*
"On." American Heritage Dictionary of the English Language, Fifth Edition. Copyright © 2011 by Houghton Mifflin Harcourt Publishing Company.*
"Upon." American Heritage Dictionary of the English Language, Fifth Edition. Copyright © 2011 by Houghton Mifflin Harcourt Publishing Company.*

* cited by examiner

*Primary Examiner* — Donald Spamer
(74) *Attorney, Agent, or Firm* — Swanson & Bratschun, L.L.C.

(57) ABSTRACT

The invention provides for plant oil extraction. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

15 Claims, 5 Drawing Sheets

| Polarity Index | Solvent | Solubility in Water (%) |
|---|---|---|
| 0 | N-Butane C4H10 | 0.0002 |
| 0 | Heptane | 0.0003 |
| 0 | Hexane | 0.001 |
| 0 | Pentane | 0.004 |
| 0.2 | Cyclohexane | 0.01 |
| 1 | Trichloroethylene | 0.11 |
| 1.6 | Carbon Tetrachloride | 0.08 |
| 2.2 | Di-Iso-Propyl Ether | 0 |
| 2.4 | Toluene | 0.051 |
| 2.5 | Methyl-t-Butyl Ether | 4.8 |
| 2.5 | Xylene | 0.018 |
| 2.7 | Benzene | 0.18 |
| 2.8 | DiEthyl Ether | 6.89 |
| 3.1 | Dichloromethane | 1.6 |
| 3.5 | 1,2-Dichloroethane | 0.81 |
| 3.9 | Butyl Acetate | 7.81 |
| 3.9 | Iso-Propanol | 100 |
| 4 | n-Butanol | 0.43 |
| 4 | Tetrahydrofuran | 100 |
| 4 | n-Propanol | 100 |
| 4.1 | Chloroform | 0.815 |
| 4.4 | Ethyl Acetate | 8.7 |
| 4.7 | 2-Butanone | 24 |
| 4.8 | Dioxane | 100 |
| 5.1 | Acetone | 100 |
| 5.1 | Methanol | 100 |
| 5.2 | Ethanol | 100 |
| 5.8 | Acetonitrile | 100 |
| 6.2 | Acetic Acid | 100 |
| 6.4 | Dimethylformamide | 100 |
| 7.2 | Dimethyl Sulfoxide | 100 |
| 9 | Water | 100 |

Fig. 2

PLANT OIL EXTRACTION

CLAIM OF PRIORITY

This application is related to and claims priority from U.S. Provisional Application No. 61/217,911 titled PLANT EXTRACTOR by McGhee, filed on Jun. 5, 2009.

FIELD OF THE INVENTION

The present invention relates to plant oil extraction, and more specifically to the extraction of plant oil from plant material.

Problem Statement

Interpretation Considerations

This section describes the technical field in more detail, and discusses problems encountered in the technical field. This section does not describe prior art as defined for purposes of anticipation or obviousness under 35 U.S.C. section 102 or 35 U.S.C. section 103. Thus, nothing stated in the Problem Statement is to be construed as prior art.

DISCUSSION

The processes and apparatuses utilized for plant oil extraction require complex compressors, vacuums, energy, and time. Accordingly, there is a need for systems, methods and apparatuses that simplify the process of plant oil extraction.

BRIEF DESCRIPTION OF THE DRAWINGS

Various aspects of the invention, as well as an embodiment, are better understood by reference to the following detailed description. To better understand the invention, the detailed description should be read in conjunction with the drawings and tables, in which:

FIG. 2 is a table of the polarity and solubility in fluid of several solvents.

EXEMPLARY EMBODIMENT OF A BEST MODE

Interpretation Considerations

Figure 1:
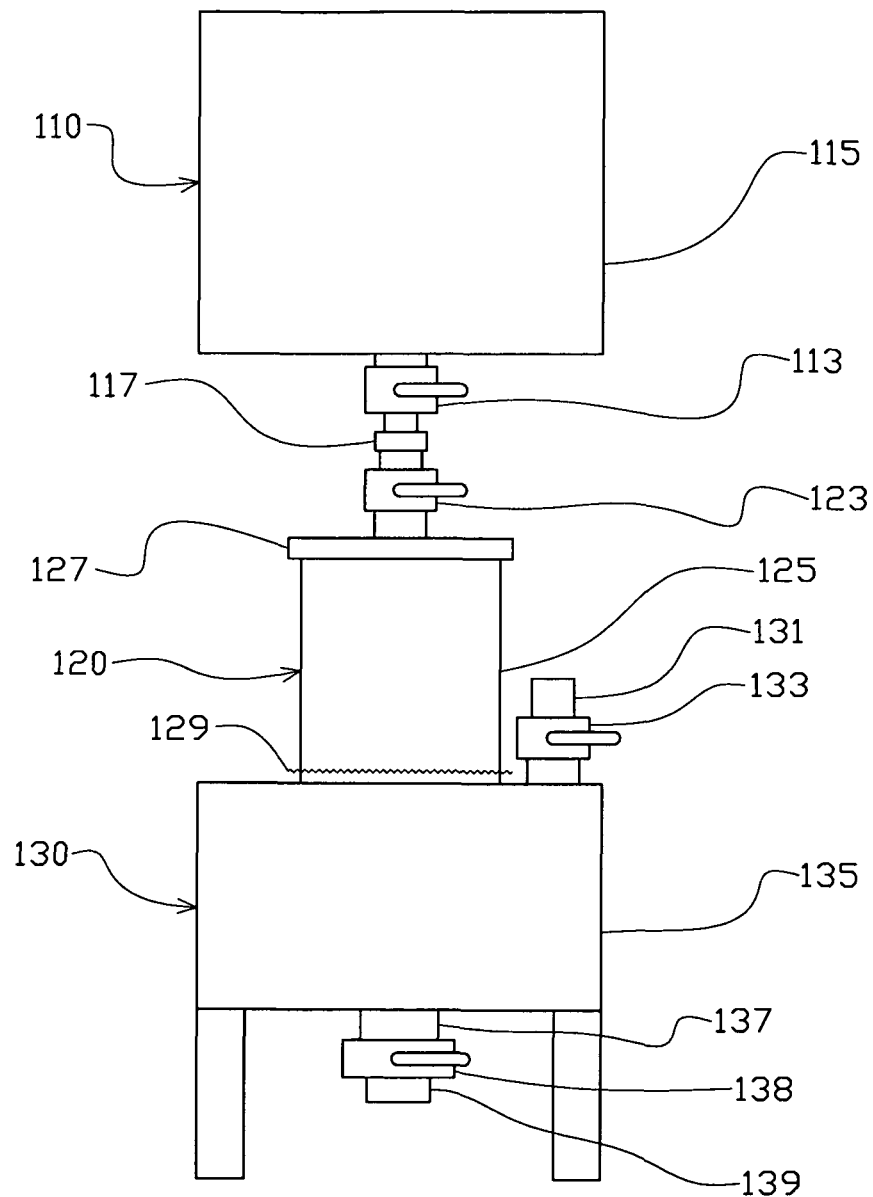
FIG. 1 shows a tabletop plant oil extractor.

When reading this section (An Exemplary Embodiment of a Best Mode, which describes an exemplary embodiment of the best mode of the invention, hereinafter "exemplary embodiment"), one should keep in mind several points. First, the following exemplary embodiment is what the inventor believes to be the best mode for practicing the invention at the time this patent was filed. Thus, since one of ordinary skill in the art may recognize from the following exemplary embodiment that substantially equivalent structures or substantially equivalent acts may be used to achieve the same results in exactly the same way, or to achieve the same results in a not dissimilar way, the following exemplary embodiment should not be interpreted as limiting the invention to one embodiment.

Likewise, individual aspects (sometimes called species) of the invention are provided as examples, and, accordingly, one of ordinary skill in the art may recognize from a following exemplary structure (or a following exemplary act) that a substantially equivalent structure or substantially equivalent act may be used to either achieve the same results in substantially the same way, or to achieve the same results in a not dissimilar way.

Accordingly, the discussion of a species (or a specific item) invokes the genus (the class of items) to which that species belongs as well as related species in that genus. Likewise, the recitation of a genus invokes the species known in the art. Furthermore, it is recognized that as technology develops, a number of additional alternatives to achieve an aspect of the invention may arise. Such advances are hereby incorporated within their respective genus, and should be recognized as being functionally equivalent or structurally equivalent to the aspect shown or described.

Second, the only essential aspects of the invention are identified by the claims. Thus, aspects of the invention, including elements, acts, functions, and relationships (shown or described) should not be interpreted as being essential unless they are explicitly described and identified as being essential. Third, a function or an act should be interpreted as incorporating all modes of doing that function or act, unless otherwise explicitly stated (for example, one recognizes that "tacking" may be done by nailing, stapling, gluing, hot gunning, riveting, etc., and so a use of the word tacking invokes stapling, gluing, etc., and all other modes of that word and similar words, such as "attaching").

Fourth, unless explicitly stated otherwise, conjunctive words (such as "or", "and", "including", or "comprising" for example) should be interpreted in the inclusive, not the exclusive, sense. Fifth, the words "means" and "step" are provided to facilitate the reader's understanding of the invention and do not mean "means" or "step" as defined in §112, paragraph 6 of 35 U.S.C., unless used as "means for—functioning—" or "step for—functioning—" in the Claims section. Sixth, the invention is also described in view of the Festo decisions, and, in that regard, the claims and the invention incorporate equivalents known, unknown, foreseeable, and unforeseeable. Seventh, the language and each word used in the invention should be given the ordinary interpretation of the language and the word, unless indicated otherwise.

As will be understood by those of ordinary skill in the art, various structures and devices are depicted in block diagram form in order to avoid unnecessarily obscuring the invention. As used, herein and the accompanying drawings, B12 refers to positive 12 volts, and N12 refers to negative 12 volts. Additionally the term "set" refers to the application of 12 volts (B12), while the term "reset" refers to the removal of 12 volts.

Some methods of the invention may be practiced by placing the invention on a computer-readable medium, particularly the control and detection/feedback methodologies. Computer-readable mediums include passive data storage, such as a random access memory (RAM) as well as semi-permanent data storage such as a compact disk read only memory (CD-ROM). In addition, the invention may be embodied in the RAM of a computer and effectively transform a standard computer into a new specific computing machine.

Data elements are organizations of data. One data element could be a simple electric signal placed on a data cable. One common and more sophisticated data element is called a packet. Other data elements could include packets with additional headers/footers/flags. Data signals comprise data, and are carried across transmission mediums and store and transport various data structures, and, thus, may be used to operate the methods of the invention. It should be noted in the following discussion that acts with like names are performed in like manners, unless otherwise stated. Of course, the foregoing discussions and definitions are provided for clarification purposes and are not limiting. Words and phrases are to be given their ordinary plain meaning unless indicated otherwise.

DETAILED DESCRIPTION OF THE DRAWINGS

The present invention is a process for the extraction of plant oil from organic material—namely, plants. This process uses the energy from a change of temperature to extract the plant oil from the organic material while recapturing a solvent that is used to "pull" the oil out of the organic material so that it may be reused. The process may remove as much as 93% of the plant oil contained in the organic matter. The process is self-contained, and in a preferred embodiment needs only added heat or added cooling to create the change in temperature to operate.

FIG. 1 shows a tabletop embodiment of a plant oil extractor according to the teachings of the invention. FIG. 1 comprises a storage zone 110 which comprises a first tank 115 made out of stainless steel which is connected to and in fluid communication with a first valve 113, which is in turn connected to and in fluid communication with a second ball valve 123 via a quick disconnect fluid coupling 117. The second ball valve 123 is connected and fluidly coupled to an extraction zone 120 comprising a chamber 125, preferably made of stainless steel, having a removable cap 127 preferably threaded thereon which can be removed to allow for the placement of organic matter in the chamber 125. The cap 127 is hermetically sealed to the chamber 125.

The extraction process is achieved by the solvent contacting and reacting with an organic matter in the extraction zone 120. The solvent leeches plant oil out of the organic matter and carries it through the extraction zone 120 and into a separation zone 130, discussed below. The relationship between the first tank 115 and the chamber 125 affects the efficiency of the process. The volume of the first tank 115 is preferably at least four times the volume of the chamber 125, and preferably five times the volume of the chamber 125. At five times the volume of the chamber 125, the process creates more pressure in the extraction zone 120, thereby performing the extraction process more efficiently. A larger ratio may be used to perform the process, but may require additional tools such as vacuums or compressors to perform the process efficiently.

The chamber 125 comprises a filter 129 at the bottom to keep the organic matter in the tank, but allow oil and solvent to "drip" or otherwise migrate through to a second tank. The chamber 125 is connected to and fluidly coupled to the second tank 135 via a threaded connection. The chamber 125 and second tank 135 may be connected via any choice of couplings such as welding or epoxy, so long as the means for coupling allows the solvent and oil to flow through an opening in the bottom of the chamber 125 and into the second tank 135.

The separation zone 130 comprises the second tank 135 a third ball valve 133, a second safety quick disconnect coupling 131, a collection column 137 connected to a fourth ball valve 138, and a drainage pipe 139. The third ball valve 133 captures removes the solvent as discussed below. The collection column 137 collects the plant oil from the second tank 135. Accordingly, in practice, because the plant oil is heavier than the solvent, such as butane, the oil sinks to the bottom of the second tank 135 and collects in the column 137. A user may then articulate the fourth ball valve 138 so that the oil can be drained through the drainage pipe 139, where it can be collected via a pan, hose, bowl, bottle, or other collection means.

In one embodiment, the oil is forced through the fourth ball valve 138, assisted by a pressure of the solvent. Ideally, any solvent that escapes with the oil evaporates at room temperature. After the oil has been completely removed, the fourth ball valve 138 is closed (a user will visually see the solvent escaping, and by this will know that the oil has been removed). Preferably, the second tank 135 has height to width ratio of 1:3, to allow maximization of the evaporation of the solvent for removal purposes, and preferably has a funnel-shaped bottom portion. Of course, non-ball valve devices may be used in place of the ball valves, and alternatives include valves such as choke valves, butterfly valves, needle valves, and globe valves, for example.

Once the oil is removed from the separation zone 130, the solvent is recycled and transported back to the storage zone 110 (which may be achieved by either decreasing the temperature of the first tank 115 or increasing the temperature of the second tank 135; according changes in temperature increases pressure in the warmer zone and the separation zone 130, and decreases the pressure in the colder zone, the storage zone 110, thus creating the force that transfers the solvent from the separation zone 130 to the storage zone 110). After enough time has elapsed to allow substantially all of the solvent to transport into the storage zone 110, the first ball valve 113 is closed. At this point, there should be no more pressurized air inside of the second tank 135 and chamber 125. The leeched organic material is removed from the chamber 125 by removal of the cap 127.

Alternative solvent recapture methods may be used. For example, in another methodology, after the extraction process is completed and the oil removed, the first ball valve 113, the second ball valve 123, the fourth ball valve 138 are all set closed. The first tank 115 and the first ball valve 113 are disconnected via the safety quick disconnect 117 from the second ball valve 123. Then a hose (not shown but understood by those in the art) is connected to the first safety disconnect 117 and the second safety disconnect 131. When the hose has connected both tanks 115, 135, the first ball valve 113 and the third ball valve 133 are both set to open. This recapture process allows the solvent to transport from the second tank 135 into the first tank 115 without traveling up through the chamber 125 and the extracted organic matter. Once the solvent has been completely transported into the first tank 115, the first and third ball valves 113, 133, are closed, the hose disconnected. At this point, there should be no more pressurized air inside of the second tank 135 and chamber 125.

The solvent can be any of a number of chemical solvents (or mixtures) selected to match the polarity of the oil in the organic material, as is understood by those of skill in the plant oil extraction arts. The most common used solvent is N-Butane (Butane). Butane is a "carrier solvent" and self-generates the pressure needed to perform the extraction. When in gaseous phase, Butane will transport to the coldest area where it condenses into a liquid.

There are four ways to accomplish the transportation of Butane through the invention. The first way is to reduce the pressure in the second tank 135 by chilling the tank to a temperature below room temperature. This chilled area creates a vacuum that pulls the solvent from the first tank 115 and through the column of plant material in the chamber 125 with great force and then into the second tank 135. The second way is to heat the top, first tank 115 increasing pressure in the first tank 115 and forcing the solvent to move through the chamber 125 and organic matter and into the bottom tank 135. In a third way, pressure can be added to the first tank 115 via a compressor (this performs similarly to heating of the first tank 115, which adds the pressure). The fourth way is to allow the solvent to flow into the organic matter and drip out the bottom of the chamber 125 and into the second tank 135.

FIG. 2 is a table showing the Polarity values for each of the options for solvents, and their solubility in fluid (note that many organic oils cannot be extracted using Soxhlet extraction or a Carbon Dioxide extraction). Butane also can be mixed with other solvents to adapt the polarity needed extract an oil.

Figure 3:
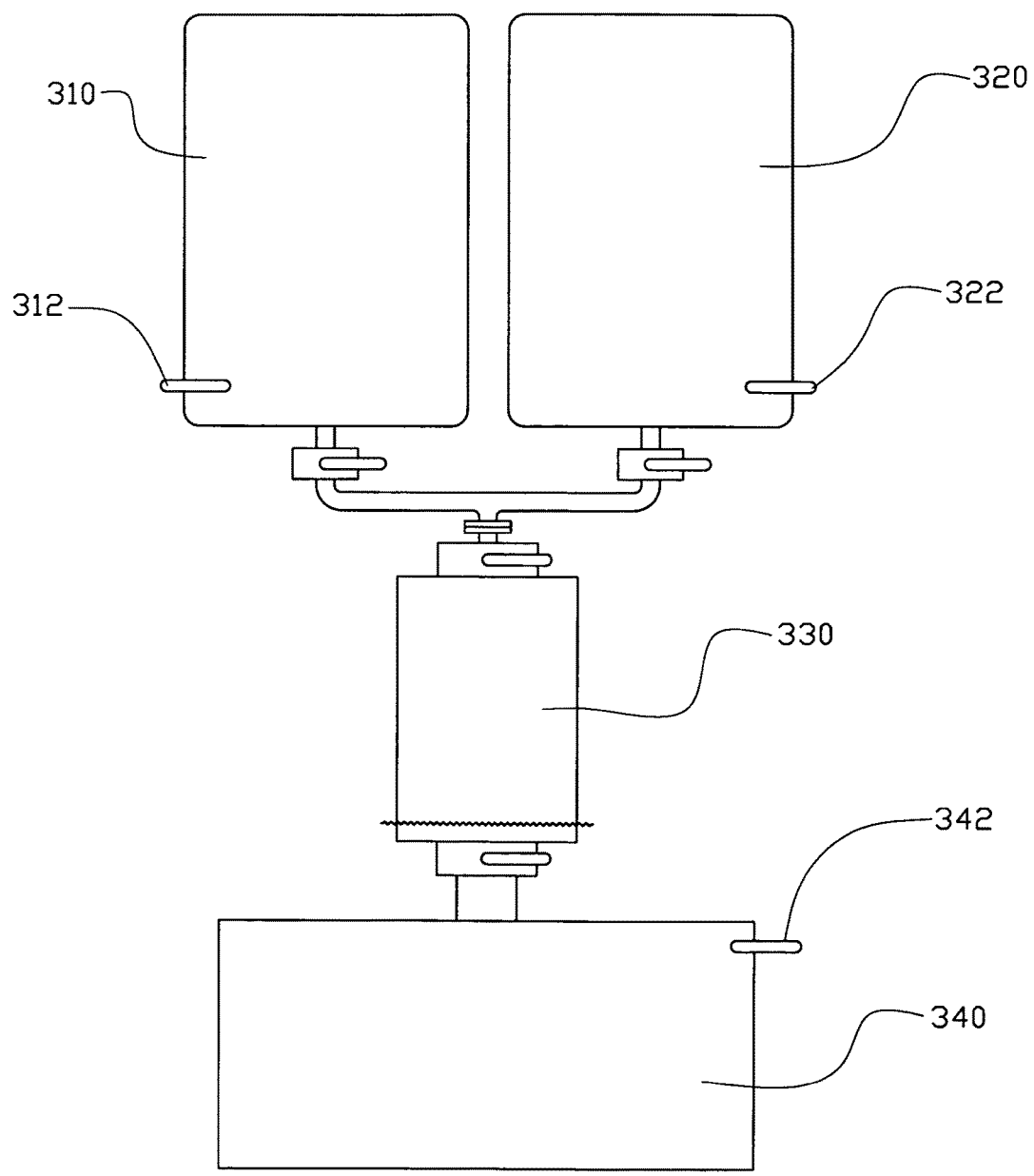
FIG. 3 shows a commercial sized plant oil extractor.

Shown in FIG. 3 is a larger scale production model of the invention. The vertically stacked tanks 310, 320, can be made of any number of tanks, in this figure just a first tank 310 and second tank 320 are shown, but there is no limit to the size or number of tanks that can be used. As previously discussed, the tanks 310,320 have five times the volume as organic material chamber 330. For example, if the tanks 310, 320 have a ten-gallon volume, then the chamber preferably has a two-gallon volume.

In one preferable operation, heat is added to the first and second tanks 310 and 320, to create additional pressure and to reduce the time required to move the entire amount of solvent (solvent can be transported without heating the tanks 31, 320, but the process requires more time). The amount of time depends on the volume of solvent used. Further, cooling a collection tank 340 creates a vacuum that pulls the solvent through the chamber 330 and into the collection tank 340.

Recapture is accomplished in manners substantially similar to those discussed above in reference to the embodiment of FIG. 1. In this instance, the heat needs to be added to the bottom tank 340 and cold temperatures added to the top tank or tanks 310, 320. Optional pressure release valves 312, 322 and 342 are located on each of the collection tank 340 and the top tanks 310, 320.

Figure 4:
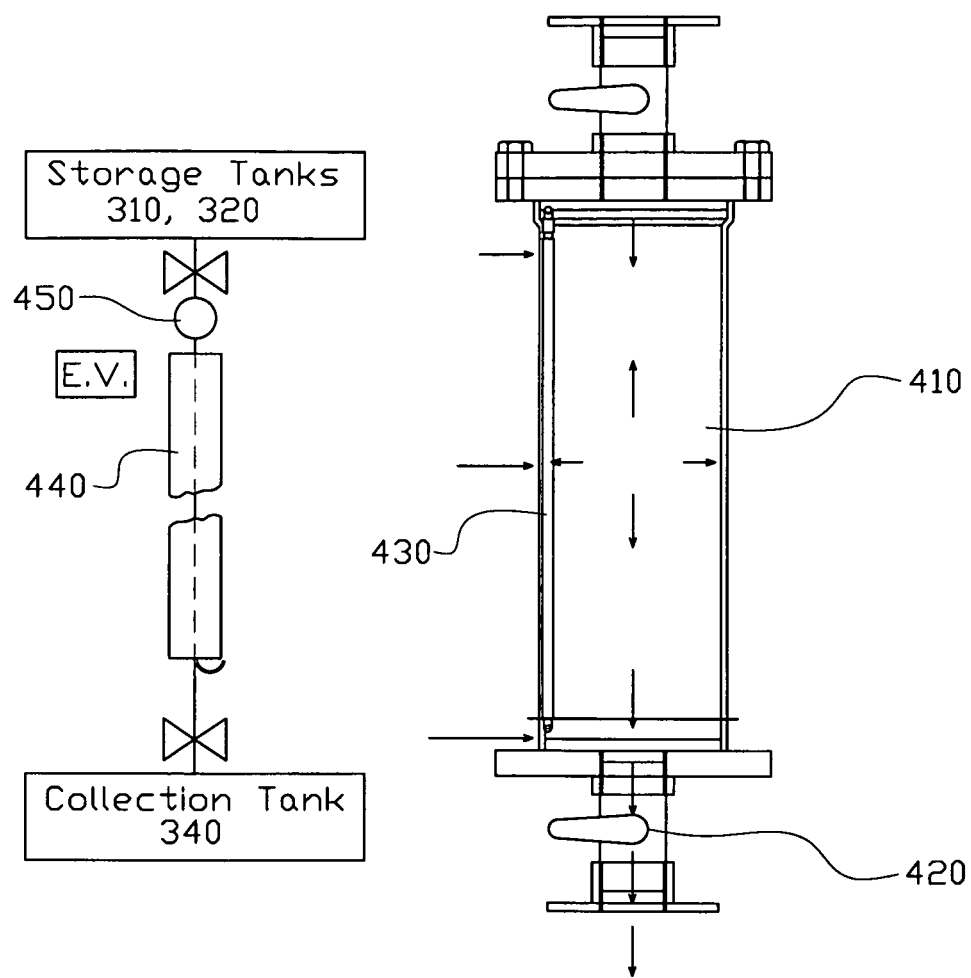
FIG. 4 shows a chamber of the commercial size of the oil extractor.
Figure 5:
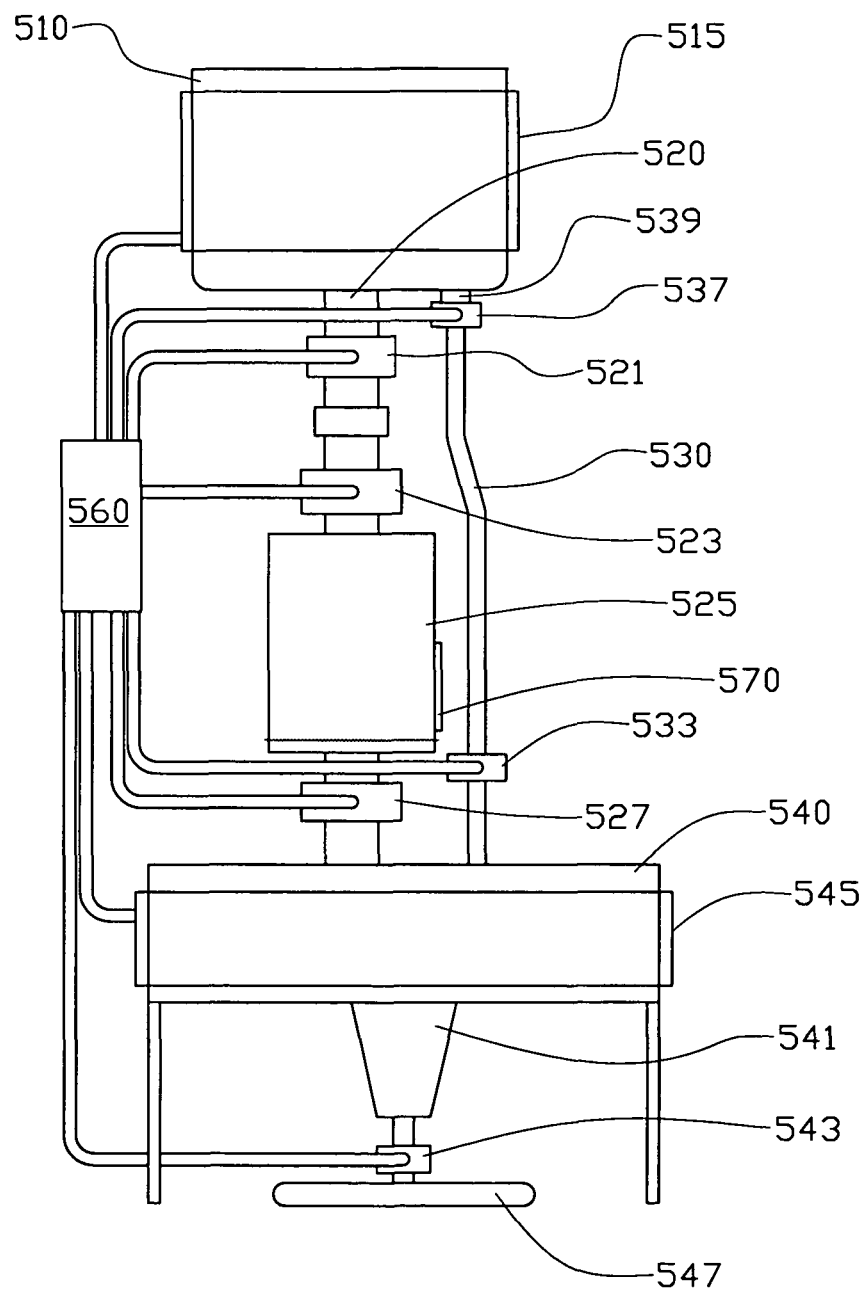
FIG. 5 illustrates the automated system of the oil extractor.

FIG. 4 illustrates the chamber 330 in more detail. To keep the process self-contained, a ball valve 420 is coupled between the chamber 410 and the collection tank 340 (not shown in FIG. 4). The ball valve 420 can be closed to allow the solvent to soak more thoroughly into the organic matter, before being opened to allow the plant oil to pass into the tank 340. In addition, a vent tube 430 is provided along a side of chamber 410 with a check ball valve 440 that allows pressure to escape from the chamber 410 and collection tank into storage tanks 310, 320. When the difference in pressure between the top tanks and the chamber 410 reaches equilibrium, the ball 450 drops into the check ball valve 440, sealing off the vent tube 430, so that no liquid solvent can escape. When the difference in pressure becomes sufficient, the bottom pressure pushes up the ball 450 up allowing pressure to escape through the vent tube 430 and reduce the difference in pressures. This vent tube with check ball allows the system to operate without the need for extra compressors or vacuums.

The oil extraction process can be completely automated. FIG. 500 is an automated embodiment of the invention having a storage tank 510, an extraction line 520, a recapture line 530, a heating/cooling jacket for first tank 515, a first ball valve 521 exiting the first tank 510 connected to a second ball valve 522, connected to the chamber 525 connected to a third ball valve connected to a recapture tank 540 which has a heating/cooling jacket 545, an oil drainage trough 541 connected to a fourth ball valve 543 which when open drains into an oil collection reservoir 547. The recapture tank 540 is coupled to a fifth ball valve 533 via the recapture line 530, and is connected via a sixth ball valve 537 connected to the first tank 510. All of the ball valves 521, 523, 527, 533, 537, 543 are connected to computer control system, and are preferably electrically articulated. The cooling/heating jackets 515, 545 are also connected to the computer system which also controls electrical pumps (not shown) that transfer cool or warm fluids to the proper jacket based on the process being performed.

To begin an automated extraction process, a solvent is loaded into the storage tank 510, organic matter is load into the chamber 525, and all of the ball valves 521, 523, 527, 533, 537, 543 are closed. An automated control board 560 is controlled by a computer system, and operates to open the first ball valve 521 and the second ball valve 523 allowing the solvent to drain into the chamber 525 and soak into the organic matter. After either a predetermined amount of time, or when a "trigger condition" is sensed, the automated control board 560 opens the third ball valve 527 allowing the solvent and extracted oil to drain into the second tank 540. If additional temperature change is needed to force the solvent to transport, the automated control board 560 turns on the first heating sleeve 515 for the first tank 510 and/or turn on the chilling sleeve 545 for the second tank 540. After either a predetermined amount of time had elapsed, or a "triggering condition" is sensed, the solvent and oil are determined to have transferred into the recapture tank 540. The automated control board 560 then closes the first, second, and third ball valves 521, 523, 533 and opens the fourth ball valve 543 to drain the oil out of the oil collection reservoir. The extraction process has now been completed, and the automated control board 560 closes the fourth ball valve.

The automated control board 560 starts the recapture process by opening the fifth and sixth ball valves 533, 537. The automated control board 560 starts the chilling jacket 515 on the first tank 510 and/or the heating jacket 545 on the second tank 540 creating a pressurized vacuum forcing the solvent to travel into the first tank 510 where it condenses. Next, the automated control board 560 closes the fifth and sixth ball valves 533, 537. The solvent is now in the first tank 510. In order to eliminate condensed solvent from escaping into the recapture line, a check ball valve 539 is provided to allow the solvent to flow into the first tank 510, but prevent the liquid solvent from leaking out and flowing down into the recapture tank 540. In this embodiment, an easy access cap 570 has been added to the chamber for easier replacement of the organic matter. The access cap 570 hermetically seals to the chamber 525, and withstands pressures as needed, which are determinable based on factors known to those of skill in the art.

As an alternative, the operation of the heating/chilling jackets 515, 545 can be accomplished by utilizing two fluid reservoirs, one preferably maintained at a warm temperature such as 110° F. (43.33° C.)+/−10 F, for example, and the other maintained at a very cold temperature such as 35° F. (1.66° C.)+/−3 F, for example. Each jacket 515, 545 couples to circulation pumps—each running a "to" line and "from" line between each reservoir and jacket. During the extraction process, the automated control board 560 turns on the warm fluid reservoir pump for the heating/chilling jacket 515 for the first tank 510 circulating the warm fluid through the jacket 515 and back into the reservoir to be reheated and/or turn on the cold fluid pump for the heating/chilling jacket 545 for the second tank 540 circulating the cold fluid into the jacket 545 and back to the cold fluid reservoir to be re-chilled. The pumps circulate the proper temperature fluid to the proper jackets for the proper tanks to execute the extraction process. When the performing the extraction process, the automated control board 560 shuts off the fluid pumps used for extraction and turn on the opposite pumps, the cold fluid pump for the jacket 515 for the first tank 510 and/or the warm fluid pump for the jacket 545 for the second tank 540. When the recapture process is completed, the automatic control board 560 would turn off the fluid pumps. Utilizing the automated control board, the circle of the extraction process and the recapture process is automated. Preferred fluids include water and anti-freezes (for example, ethylene glycol).

Though the invention has been described with respect to a specific preferred embodiments, many variations and modifications will become apparent to those skilled in the art upon reading the present application. Specifically, the invention may be altered in ways readily apparent to those of ordinary skill in the art upon reading the present disclosure. It is therefore the intention that the appended claims and their equivalents be interpreted as broadly as possible in view of the prior art to include all such variations and modifications.

The invention claimed is:

1. A system for extracting compounds from a compound-bearing material, comprising:
   a first tank adapted to store a solvent;
   an extraction chamber having a top, a bottom, and a hollow expanse between the top and the bottom adapted to hold the compound-bearing material, wherein the extraction chamber comprises a fluid inlet through the top, and wherein said fluid inlet is in fluid communication with an outlet from the first tank; and
   a second tank adapted to store the solvent; wherein the second tank is removably coupled to the extraction chamber;
   a recapture line providing a fluid pathway between the second tank and the first tank that does not extend through the extraction chamber; and
   a heating element in thermal communication with the second tank providing for heating of the second tank to evaporate the solvent and force the solvent to be transported in a vapor phase from the second tank to the first tank.

2. The system of claim 1 wherein the top further comprises a removable cap.

3. The system of claim 1 wherein the outlet from the first tank and the fluid inlet to the extraction chamber together comprise a first valve attached to the first tank, a second valve attached to the extraction chamber and a fluid coupling between the first valve and the second valve.

4. The system of claim 1 wherein the first tank has a volume of at least four times the volume of the extraction chamber.

5. The system of claim 1 wherein the extraction chamber is coupled to the second tank via a threaded connection.

6. The system of claim 1 further comprising a filter coupled between the extraction chamber and the second tank.

7. The system of claim 1 further comprising a third valve coupled between the extraction chamber and the second tank.

8. The system of claim 1 wherein the second tank comprises an exit valve providing for extracted oil to be removed from the second tank.

9. The system of claim 1 wherein the solvent is Butane.

10. The system of claim 1 wherein the second tank comprises an interior height to width ratio of at least 1:3.

11. The system of claim 1 wherein the heating element in thermal communication with the second tank comprises a fluid jacket in fluid communication with a heating fluid source.

12. The system of claim 1 further comprising:
   a cooling element in thermal communication with the first tank providing for cooling of the first tank to, in combination with the heating element in thermal communication with the second tank, evaporate the solvent and force the solvent to be transported in a vapor phase from the second tank to the first tank.

13. The system of claim 12 wherein the cooling element in thermal communication with the first tank comprises a fluid jacket in fluid communication with a cooling fluid source.

14. The system of claim 1 further comprising:
   a first combination heating and cooling element in thermal contact with the first tank, wherein the first combination heating and cooling element may selectively cause heating of the first tank to force the solvent to be transported from the first tank to the extraction chamber, or may selectively cause cooling of the first tank to force the solvent to be transported in a vapor phase from the second tank to the first tank through the recapture line; and
   a second combination heating and cooling element in thermal contact with the second tank, wherein the second combination heating and cooling element may selectively cause cooling of the second tank to force the solvent to be transported from the first tank to the extraction chamber, or may selectively cause heating of the second tank to force the solvent to be transported in the vapor phase from the second tank to the first tank through the recapture line, wherein the first combination heating and cooling element and the second combination heating and cooling element are the only apparatus elements of the system causing solvent to be transported to or from the first tank and the second tank.

15. The system of claim 14 wherein the first combination heating and cooling element comprises a fluid jacket in fluid communication with a cooling fluid source and a heating fluid source, and wherein the second combination heating and cooling element comprises a fluid jacket in fluid communication with a cooling fluid source and a heating fluid source.

* * * * *